United States Patent
Yi et al.

(10) Patent No.: US 7,318,406 B2
(45) Date of Patent: Jan. 15, 2008

(54) BOWL-IN-PISTON OF A CYLINDER IN A DIRECT INJECTION ENGINE

(75) Inventors: Jianwen Yi, Canton, MI (US); Zheng Xu, Canton, MI (US); Steven Wooldridge, Saline, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 11/279,234

(22) Filed: Apr. 10, 2006

(65) Prior Publication Data

US 2007/0235004 A1  Oct. 11, 2007

(51) Int. Cl.
*F02F 3/26* (2006.01)
*F02B 23/10* (2006.01)

(52) U.S. Cl. .............. 123/276; 123/307; 123/298
(58) Field of Classification Search ............. 123/269, 123/276, 279, 285, 298, 301, 307
See application file for complete search history.

(56) References Cited

U.S. PATENT DOCUMENTS

| | | | |
|---|---|---|---|
| 6,035,822 A * | 3/2000 | Suzuki et al. ............. 123/276 |
| 6,035,823 A * | 3/2000 | Koike et al. .............. 123/276 |
| 6,129,065 A * | 10/2000 | Ueda et al. ............ 123/193.6 |
| 6,129,070 A | 10/2000 | Jingu et al. |
| 6,152,103 A * | 11/2000 | Kudo et al. ............... 123/298 |
| 6,158,410 A * | 12/2000 | Piock et al. ............... 123/301 |
| 6,186,113 B1 * | 2/2001 | Hattori et al. ............. 123/298 |
| 6,263,855 B1 * | 7/2001 | Kobayashi et al. ........ 123/295 |
| 6,289,870 B1 * | 9/2001 | Kanda et al. .............. 123/298 |
| 6,311,665 B1 * | 11/2001 | Yasuoka et al. ........... 123/260 |
| 6,314,935 B2 * | 11/2001 | Tanaka et al. ............. 123/298 |
| 6,334,426 B1 * | 1/2002 | Sasaki et al. .............. 123/298 |
| 6,336,437 B1 | 1/2002 | Baika et al. |
| 6,341,591 B1 * | 1/2002 | Tsutsumi et al. .......... 123/295 |
| 6,460,509 B1 * | 10/2002 | Muramatsu et al. ....... 123/305 |
| 6,494,178 B1 * | 12/2002 | Cleary et al. ............. 123/276 |
| 6,588,396 B1 * | 7/2003 | Cleary et al. ............. 123/276 |
| 6,629,518 B2 * | 10/2003 | Baika et al. ............... 123/298 |
| 6,651,611 B2 * | 11/2003 | Lippert et al. ............. 123/295 |
| 6,651,612 B2 | 11/2003 | Kobayashi |
| 6,708,667 B2 * | 3/2004 | Suzuki et al. ............. 123/262 |
| 6,725,827 B2 * | 4/2004 | Ueda et al. ............... 123/295 |
| 6,840,210 B2 * | 1/2005 | Baika et al. ............... 123/298 |
| 6,892,695 B2 | 5/2005 | Schmitz et al. |
| 6,910,455 B2 * | 6/2005 | Sczepanski et al. .... 123/193.6 |

(Continued)

*Primary Examiner*—Hai Huynh
(74) *Attorney, Agent, or Firm*—Allan J. Lippa; Alleman Hall McCoy Russell & Tuttle LLP

(57) ABSTRACT

A piston in a direct injection spark ignition internal combustion engine is configured to reciprocate upward and downward within a combustion chamber along a reciprocating axis. The piston comprises an upper end which partly defines the combustion chamber; a bowl defined on the upper end of the piston, the bowl having an at least partially curved sidewall region extending upward from a bottom surface of the bowl, the bowl being configured so that fuel injected laterally into the bowl toward the curved sidewall region from an injection side of the bowl is directed along the curved sidewall region and upward toward a spark plug of the internal combustion engine, where the bowl has a converging contour in which a curvature of the converging contour is greater at a portion of the contour near the spark plug than a portion of the contour near the injection side of the bowl.

18 Claims, 9 Drawing Sheets

U.S. PATENT DOCUMENTS 6,928,997 B2    8/2005  Yu
6,935,302 B2 *  8/2005  Kashiwagura et al. ...... 123/295
7,055,490 B2 *  6/2006  Suzuki et al. ............... 123/276

* cited by examiner

PISTON 50

PISTON 100

PISTON 200

BOWL-IN-PISTON OF A CYLINDER IN A DIRECT INJECTION ENGINE

FIELD

The present application relates generally to a piston in a direct injection engine, and more specifically to a bowl-in-piston that provides reduced emissions and stable stratified-charge operation in a wider range of loads.

BACKGROUND AND SUMMARY

Stratified-charge direct injection (SCDI) in a direct injection spark ignition combustion system has been proven to significantly improve engine fuel economy. To produce stratified charge combustion, fuel is directly injected into cylinders of an engine during the compression stroke. This approach enables the mixture to be stratified so that a flammable mixture may be formed in the region of the spark plug while the overall air-fuel ratio is lean.

Bowled piston designs may provide various advantages for stratified-charge operation. Pistons have been designed to expand the region or window of the stratified charge combustion. For example, the U.S. Pat. No. 6,336,437 describes a piston that appears to expand the region of the stratified charge combustion toward the high engine load side. In another example, the U.S. Pat. No. 6,651,612 discloses a piston with a cavity formed in its top face to provide a stratified charge combustion at high engine speed.

However, the inventors have recognized that the problems exist for the stratified charge combustion at lower loads. For example, the engine emissions such as hydrocarbon and NOx emissions may become an issue with a wide stratified-charge operation window. In particular, NOx emissions may not meet the global emission requirement (e.g., European stage V and the U.S. standard) at a light-load stratified-charge operation or at cold start stratified operation.

Thus, according to one aspect, a piston is configured to reciprocate upward and downward within a combustion chamber of a direct injection spark ignition internal combustion engine along a reciprocating axis. The piston comprises an upper end which partly defines the combustion chamber; a bowl defined on the upper end of the piston, the bowl having an at least partially curved sidewall region extending upward from a bottom surface of the bowl, the bowl being configured so that fuel injected laterally into the bowl toward the curved sidewall region from an injection side of the bowl is directed along the curved sidewall region and upward toward a spark plug of the internal combustion engine, where the bowl has a converging contour in which a curvature of the converging contour is greater at a portion of the contour near the spark plug than a portion of the contour near the injection side of the bowl.

The converging bowl contour may help to bring fuel vapor cloud to the spark plug. Since the engine stability is closely related to the local air-fuel mixture distribution around spark plug gap location at the time of ignition, the piston with converging bowl contour may operate stably at a stratified-charge operation with an extended operating window such as at a light-load stratified-charge operation or at cold start stratified operation.

According to another aspect, a piston in a cylinder of a direct injection spark ignition internal combustion engine is configured to move along a longitudinal axis of the cylinder. The piston comprises an upper end which partly defines the combustion chamber; and a bowl defined on the upper end of the piston and having an at least partially curved sidewall region extending upward from a bottom surface of the bowl toward a spark plug side of the bowl, and a sloped bottom rising upward toward an injection side of the bowl, the bowl being configured so that fuel injected into the bowl toward the curved sidewall region from the injection side of the bowl is directed along the curved sidewall region upward toward a spark plug of the internal combustion engine, wherein the bowl has a converging contour defined at least partially by a first circle and a second circle with offset centers, the second circle being closer to the injection side of the bowl and having a larger radius than the first circle. In one embodiment, the bowl has a substantially vertical segment at the spark plug side of the bowl above the at least partially curved sidewall region.

A piston with above features has additional advantages to promote the local air-fuel mixture distribution around spark plug gap. For example, the vertical segment may promote upward motion for fuel-air mixture to reach the spark-plug location. The relative small radius of curved side wall may also enhance a strong upward motion to push the fuel cloud towards the spark plug gap. The upward slope toward the intake port side may provide smooth transition for the fuel-air mixture to focus to the side wall adjacent to the spark plug.

Engine testing data have shown that an engine with a piston having above configuration operates more stable in the stratified charge operation conditions in a wide range of injection timing and spark advance. In addition, the fuel economy at stratified combustion condition may be improved by 1.2% and NOx emissions are reduced by 1%. Furthermore, the engine may have better exhaust recirculation tolerance in some settings.

DETAILED DESCRIPTION

Figure 1:
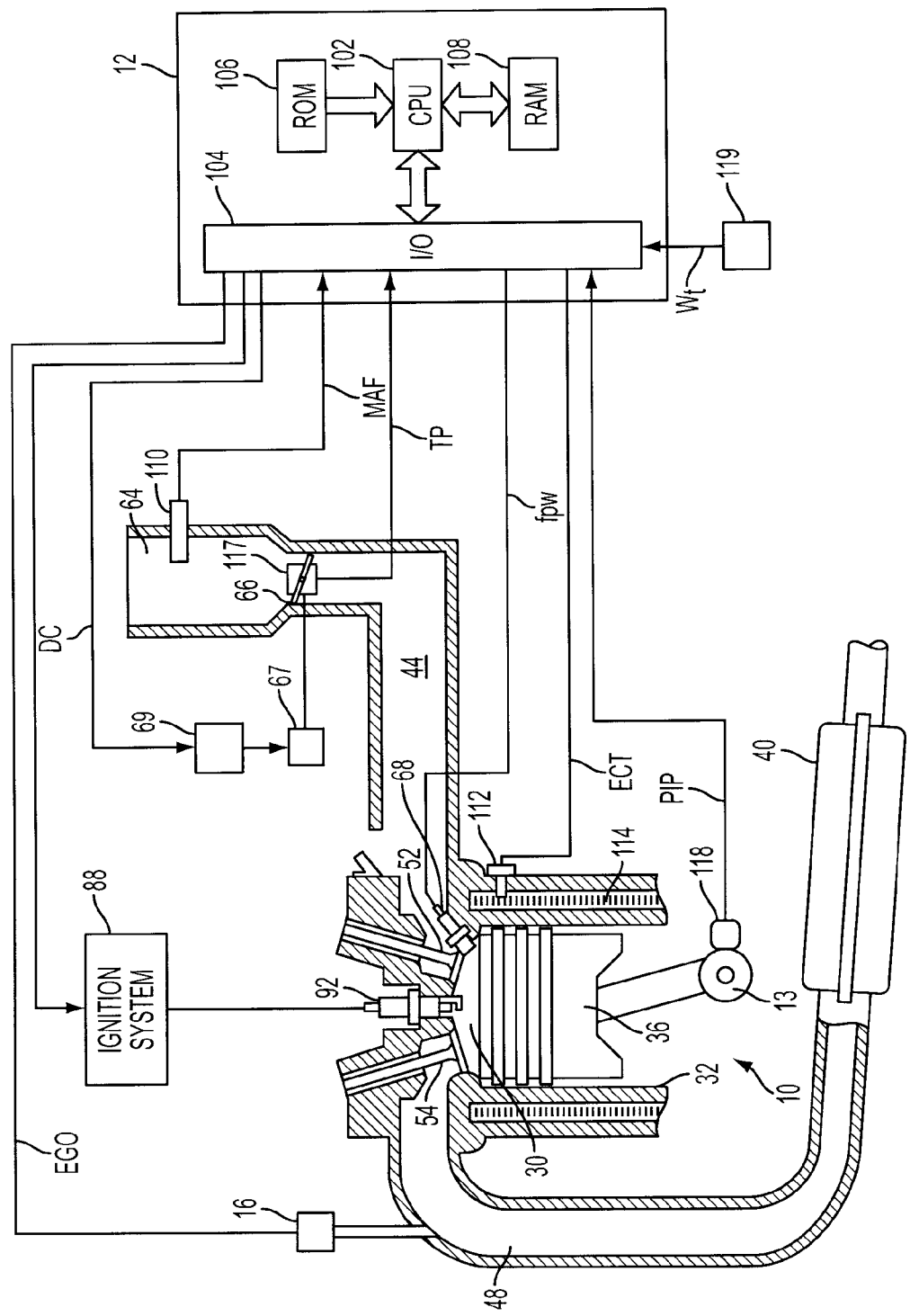
FIG. 1 is a schematic depiction of an exemplary embodiment of an engine.

FIG. 1 shows a schematic depiction of an exemplary embodiment of an internal combustion engine with a spark ignition direct injection. Engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 40.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). In another embodiment, fuel injection 68 may be coupled to the cylinder head with a direct fuel injection.

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Controller may determine the temperature of catalytic converter 20 in any suitable manner. For example, the temperature Tcat of catalytic converter 20 may be inferred from engine operations. In another embodiment, temperature Tcat is provided by temperature sensor 72.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Direct injection spark ignition may significantly improve engine fuel economy. For example, a direct injection engine may be operated in split injection modes. The engine may operate at stoichiometric near full load with injection during the intake stroke. At this operating mode, a homogeneous mixture may be obtained so as to achieve higher volumetric efficiency. At part load and low speed, the direct injection engine may operate with fuel injection during the compression stroke. Such operation enables the air-fuel mixture to be stratified. Thus, a flammable mixture is formed in the region of the spark plug but the overall air-fuel ratio is lean.

In the direct injection engine, a bowled piston design may provide various advantages. In particular, it would be desirable to have a piston design that improves fuel economy at stratified-charge operating conditions while preserving homogenous charge performance and satisfactory emission levels.

FIGS. 2-11 show exemplary embodiments of various piston designs which, in various settings, may provide improved homogeneous charge operation while preserving the stratified charge capability for the cold start operation.

Figure 2:
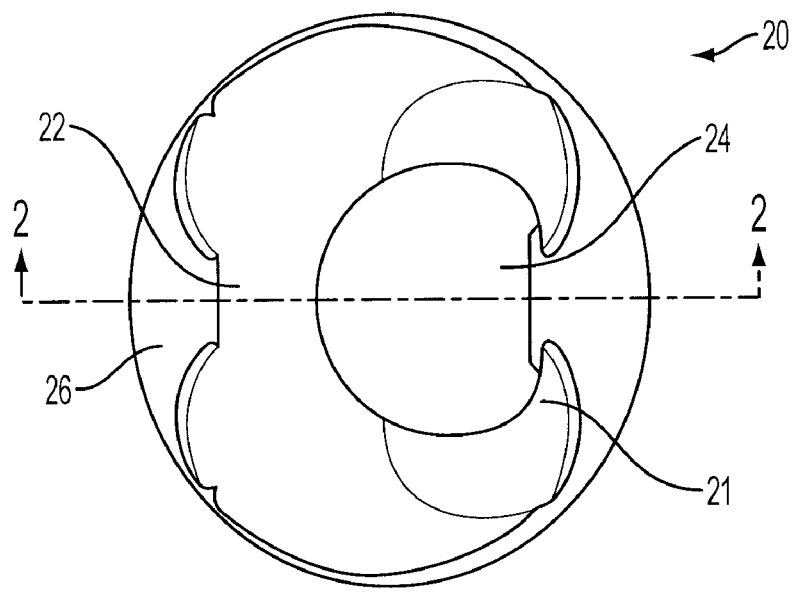
FIG. 2 is a top view of an exemplary embodiment of a bowl-in-piston.
Figure 3:
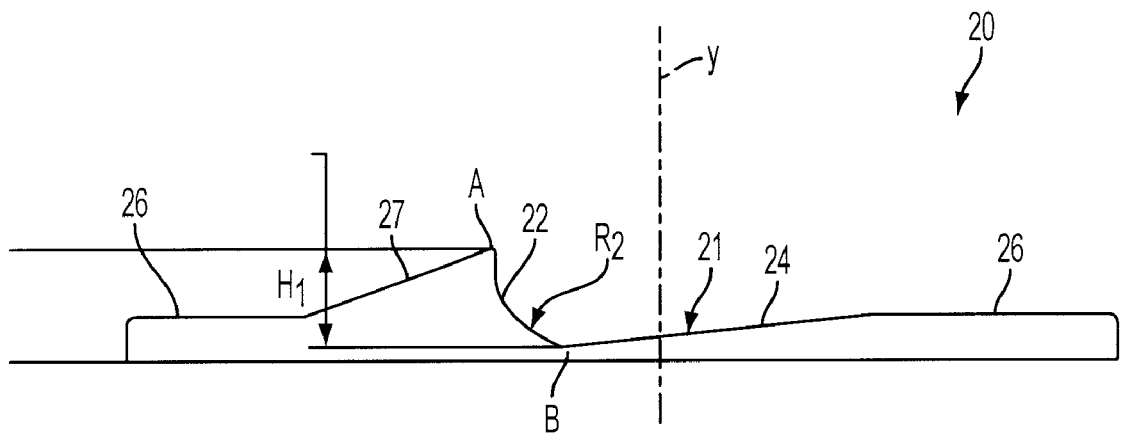
FIG. 3 is a cross-sectional view of the piston shown in FIG. 2.

FIG. 2 shows a top view of an exemplary embodiment of a bowl-in-piston. FIG. 3 is a cross-sectional view of the piston shown in FIG. 2. As shown by FIGS. 2 and 3, the bowl 21 may be formed on the top surface or the upper end of the piston 20. In one embodiment, bowl 21 may include sidewall 22 and bottom surface 24.

Piston 20 may be used in a light-load stratified-charge direct injection (LSCDI) engine. In one embodiment, the bowl size of the LSCDI piston may be shallower and smaller compared to that employed in a stratified-charge direct injection (SCDI) engine. For example, as shown in FIG. 3, side wall 22 has a small radius R2. In some embodiments, R2 may be less than H1, the shortest distance between points A and B (the deepest dimension of the bowl). In one embodiment, H1 may be 8.57 millimeters and R2 may be 7.5 millimeters. Optionally, piston 20 may have a flat surface 26 at periphery of the top surface of piston 20 and protrusion 27 may be formed which at least may have a portion higher than flat surface 26.

Figure 4:
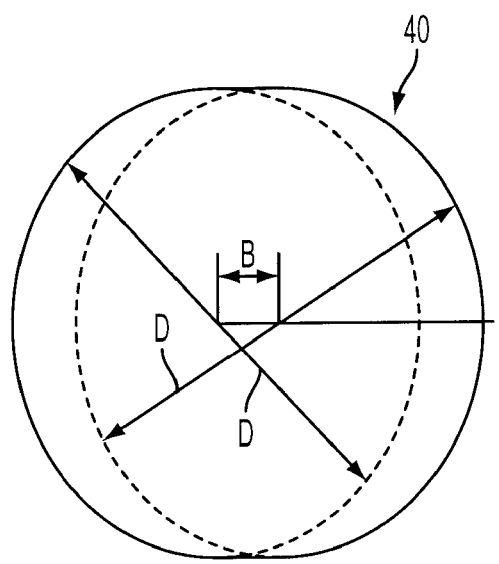
FIG. 4 shows an exemplary tool path to cut the bowl of the piston shown in FIG. 2.

FIG. 4 shows the detailed tool path 40 that may be used to provide a contour of bowl 21. The contour may be generated by two circles with the same diameter D with offset centers. In one embodiment, the diameter D may be 44 millimeters. In another embodiment, a distance between the centers of two circles, B, may be 7 millimeters.

The small radius R2 of the piston 20 may promote a stronger upward motion to push the fuel cloud towards the spark-plug gap, thus enhance the engine stability since the engine stability is closely related to the local air-fuel mixture distribution around the spark plug gap location at the time of ignition.

Figure 5:
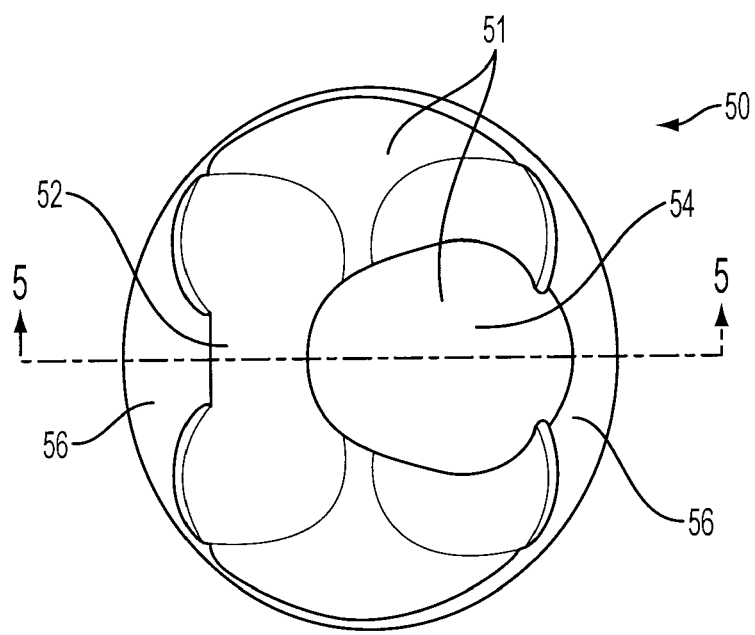
FIG. 5 is a top view of another exemplary embodiment of a bowl-in-piston.
Figure 6:
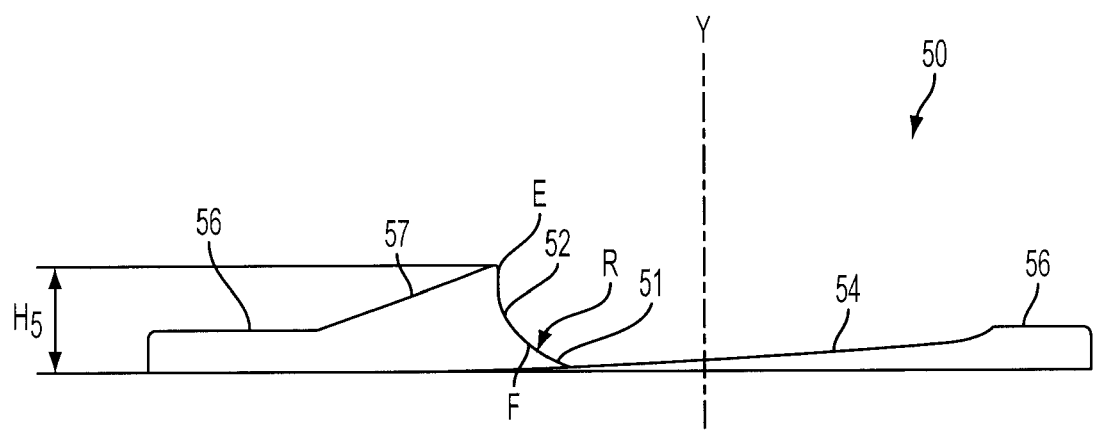
FIG. 6 is a cross-sectional view of the piston shown in FIG. 5.

FIG. 5 shows a top view of an exemplary embodiment of another bowl-in-piston. FIG. 6 is a cross-sectional view of the piston shown in FIG. 5. As shown by FIGS. 5 and 6, a bowl 51 may be formed at the upper end of piston 50 generally in a plane orthogonal to a longitudinal axis Y of piston 50. As piston moves upward and downward along axis Y, the upper end of piston 50 partially defines a combustion chamber of an internal combustion engine (i.e., within the piston cylinder). In some embodiments, bowl 51 may comprise sidewall 52 and bottom surface 54. Optionally, the upper end of piston 50 may include flat surface 56 and protrusion 57. In some embodiments, a spark plug may be located near or above the partially curved sidewall region 52 (see FIG. 11). In the cross-sectional depiction of FIG. 6, the left side or edge of the bowl may thus be referred to as the spark plug side of the bowl, with the opposing side or edge (to the right in FIG. 6) being referred to as the fuel injector side of the bowl.

Figure 7:
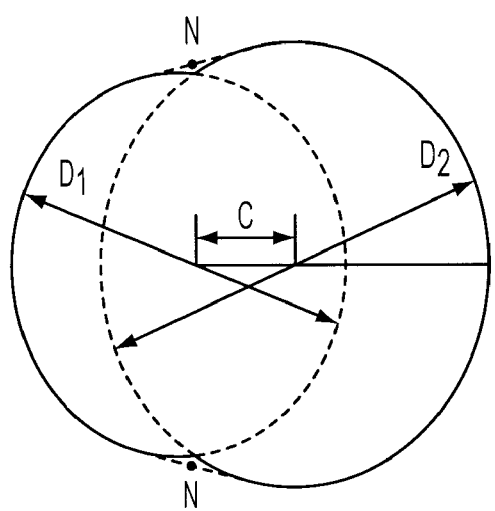
FIG. 7 shows an exemplary tool path to cut the bowl of the piston shown in FIG. 5.

In some embodiments, bowl 51 may have a converging contour. FIG. 7 shows the detailed tool path 40 of one exemplary embodiment to cut bowl 51 as shown in the FIGS. 5 and 6. The contour of piston 50 may be generated by two circles with different diameter D1 and D2. In some embodiments, D1 may be smaller than D2. In one embodiment, D1 may be 36 millimeters and D2 may be 42 millimeters. In another embodiment, a distance between the centers of two circles (C) may be 13 millimeters. In yet another embodiment, the two circles may be connected by two lines substantially tangential to both circles as indicated by N in FIG. 7 and converging toward the circle with smaller diameter. The tool path shown in FIG. 7 may create a converging shape. It should be appreciated that the upper end of piston may be carved in any suitable way to have a converging shape.

In some embodiments, bowl contour may be converged toward the spark plug side of the bowl. Referring to the tool path of FIG. 7, the smaller of the two circles would be nearer the spark plug side of the bowl than the larger circle. In certain settings, the converging bowl contour aids in bringing the injected fuel vapor cloud to the spark plug to improve the air-fuel mixture distribution around the spark plug. Thus, the combustion stability of the engine may be enhanced.

In some embodiments, the top portion of wall as marked by E in FIG. 6 may be shaped in such a way to have a vertical segment. The vertical segment E may promote upward motion for fuel-air mixture to reach the spark plug location to improve fuel-air distribution around the spark plug.

In some embodiments, the lower portion of side wall 52 next to E may be a curved segment as indicated by F. In some embodiments, curved segment F may connect vertical segment E and bottom 54. In some embodiments, curved segment F may be nearly half-circle. For example, in one embodiment, curved segment F may have a radius R which is approximately the same as H5, the deepest height of bowl 51. In one embodiment, R may be 9.0 millimeters and H5 may be 9.9 millimeters. In some embodiments, curved segment F may have small radius similar to piston 20 as described above. The relative small radius of curved sidewall may also enhance a strong upward motion to push the fuel cloud towards the spark plug gap.

In some embodiments, bottom 54 may have an upward slope rising towards an intake port side or a fuel injection side. In one embodiment, the sloped bottom 54 may be shallow. For example, the upward slope of bottom surface may provide the smooth transition for the fuel-air mixture to focus to the curved sidewall region adjacent to the spark plug and then move upward toward the spark plug.

Figure 8:
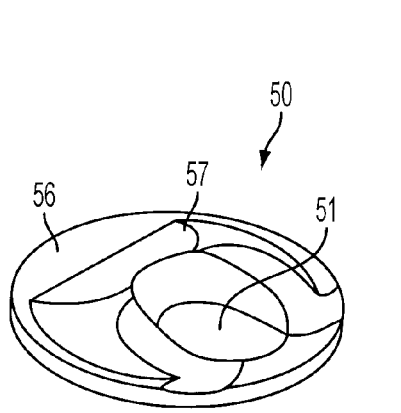
FIG. 8 is a perspective view of the piston shown in FIGS. 4-7.
Figure 11:
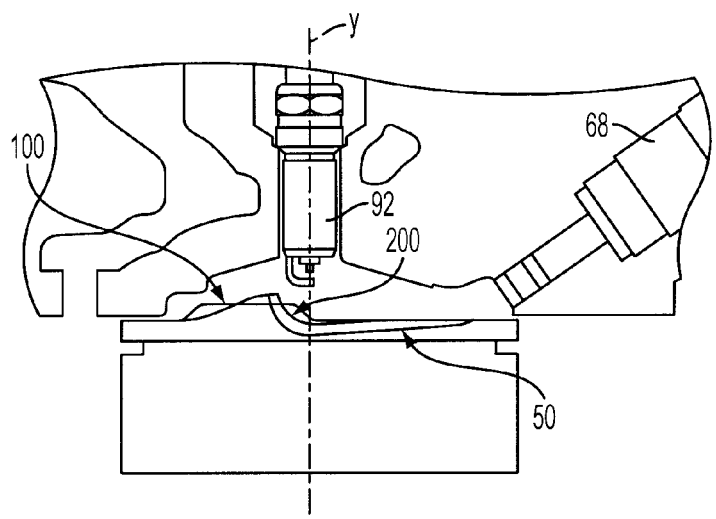
FIG. 11 shows cross sectional view of three types of pistons along with spark plug and fuel injector.

FIG. 8 shows a perspective view of one exemplary embodiment of the piston 50 shown in FIGS. 5-6. FIG. 8 shows that the upper end of piston 50 has bowl 51, flat surface 56, and protrusion 57. FIG. 11 shows an exemplary embodiment of a central cross-section of piston 50 along with spark plug 92 and fuel injector 68. In one embodiment as shown in FIG. 11, the at least partially curved sidewall region of bowl 51 may be located below and adjacent to spark plug 92. In some embodiments, spark plug 92 may be disposed along the longitudinal axis Y of piston 50. As described above, in one embodiment, bowl 51 may comprise a vertical segment at the top portion of sidewall. In another embodiment, a sidewall of bowl 51 may at least have a curved region. In yet another embodiment, the bottom of bowl may have a shallow slope rising toward fuel injector 68. In still another embodiment, bowl 51 may have a contour converging toward spark plug 92. A single feature or combination of any features described above may enhance the fuel-air distribution around spark plug 92. In some embodiments, while fuel injector 68 may be adjacent to a periphery of piston 50, bowl 51 may be configured so that fuel may be injected laterally along the sloped bottom and converged contour toward the curved sidewall region upward toward spark plug 92. In some embodiments, the vertical segment of sidewall adjacent to spark plug 92 may further guide the fuel-air mixture toward spark plug 92. Thus, engine stability may be significantly improved at wider range of load. Further, the emissions may be reduced.

Figure 12:
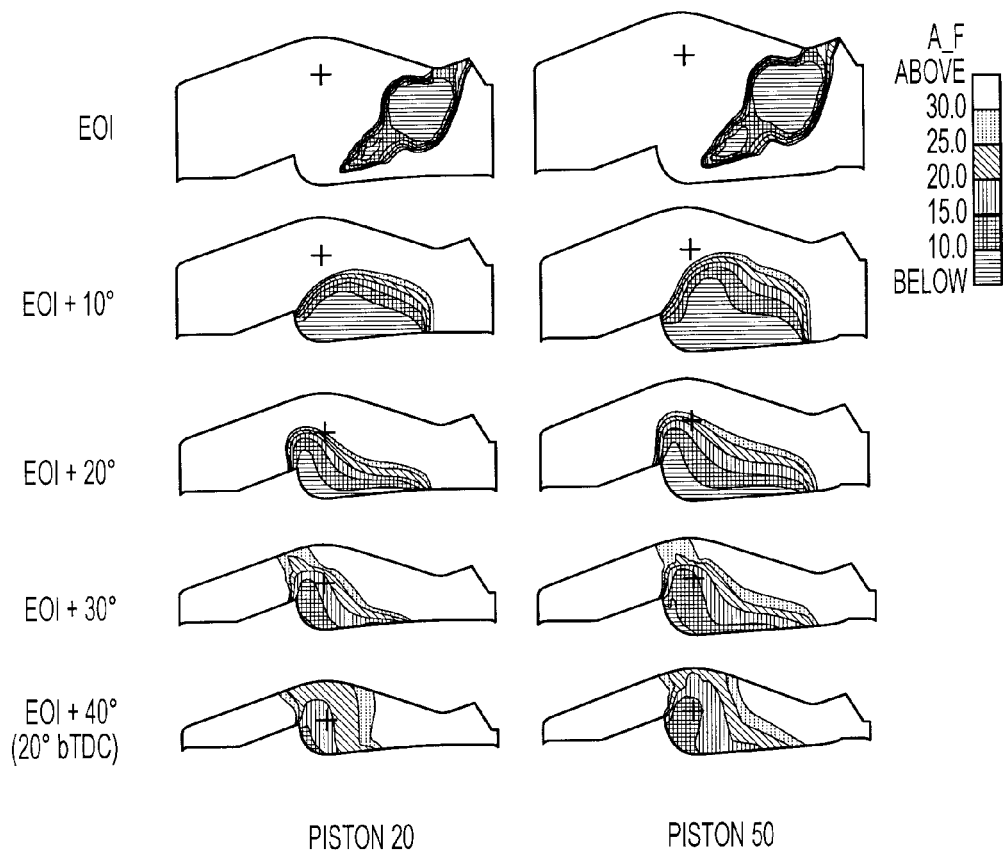
FIG. 12 shows an air-fuel mixture evolution in two embodiments of piston at 750 rpm 1 bar BMEP stratified combustion (SC) condition.

Dynamometer tests have shown that piston 50 may improve stratified-charge (SC) engine operation compared to piston 20 in certain settings. For example, FIG. 12 compares the cross-section of the predicted fuel-air mixture evolutions with pistons 20 and 50 at 750 rpm/1 bar BMEP SC condition. It can be seen that the fuel-air mixture clouds around the spark-plug gap in the piston 50 is larger than that in the piston 20. With piston 50, the mixture with air-fuel ratio in the range of 10-20 is well around the spark-plug gap location (denoted by cross) at the time of ignition, which is about 20° before top dead center (bTDC).

Figure 13:
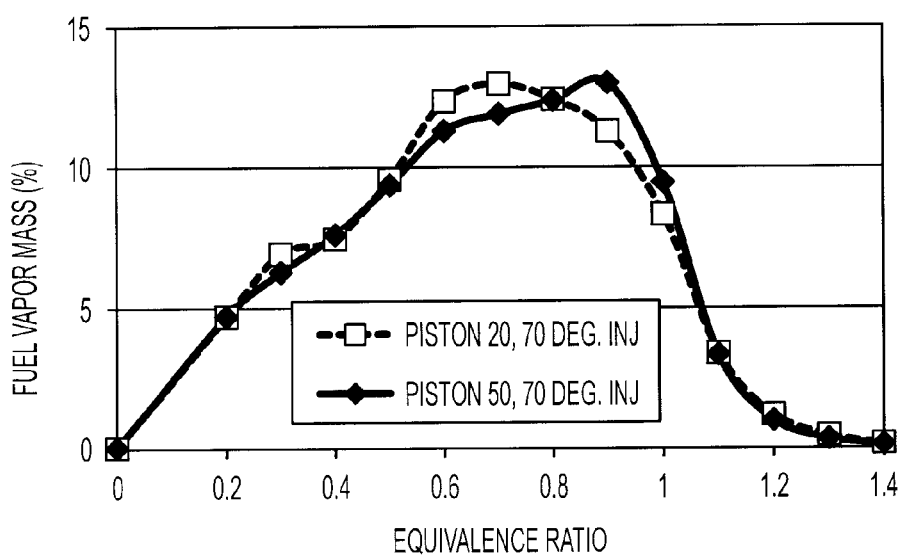
FIG. 13 shows an air-fuel mass distribution at 20 bTDC in two embodiments of piston at 750 rpm/1 bar BMEP SC condition.

FIG. 13 shows the fuel mass Probability Density Function (PDF) distribution at 20° bTDC in both pistons 20 and 50. It shows that piston 20 has more fuel distributed in the leaner region around $\phi$ (equivalence ratio) of 0.6, while the piston 50 has more fuel in the slightly richer region $\phi$ around 0.9.

Comparing the air-fuel mixture spatial distribution as shown in FIG. 12 and the mass distribution vs. equivalence ratio in FIG. 13, the modeling suggests that piston 50 will run more stably than piston 20.

Figure 14:
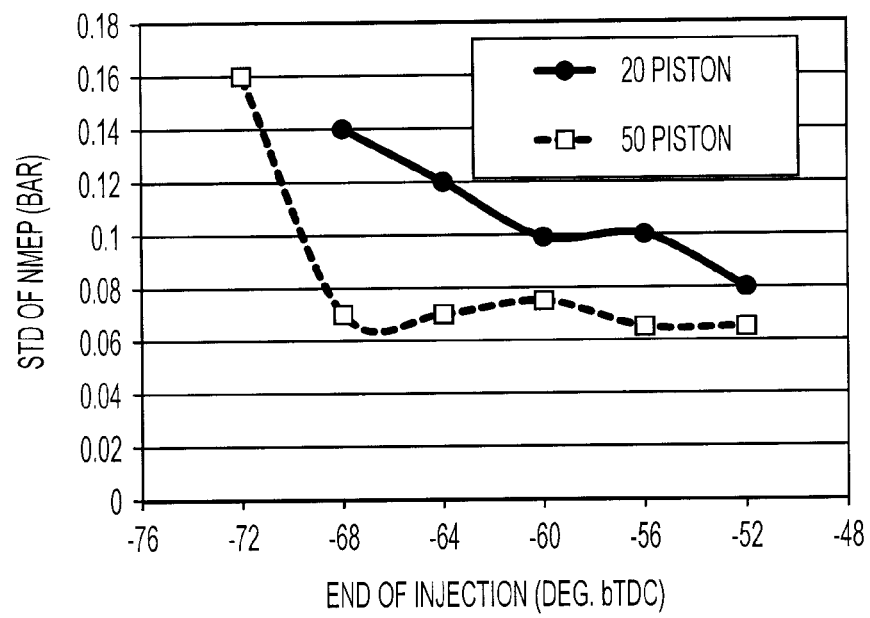
FIG. 14 shows dynamometer measured NMEP standard deviation for the two embodiments of piston versus injection time at 1500 rpm/1 bar BMEP SC operation.

FIG. 14 shows dynamometer measured NMEP standard deviation for piston 20 and piston 50 at 1500 rpm/1 bar BMEP stratified charge operation versus injection time. The exhaust valve timing in the engine with piston 50 is 10 degrees more retarded relative to the engine with piston 20. It can be seen that the engine with piston 50 runs more stably in a stratified-charge operations in a wide range of injection timing and spark advance compared to the engine with piston 20.

Figure 15:
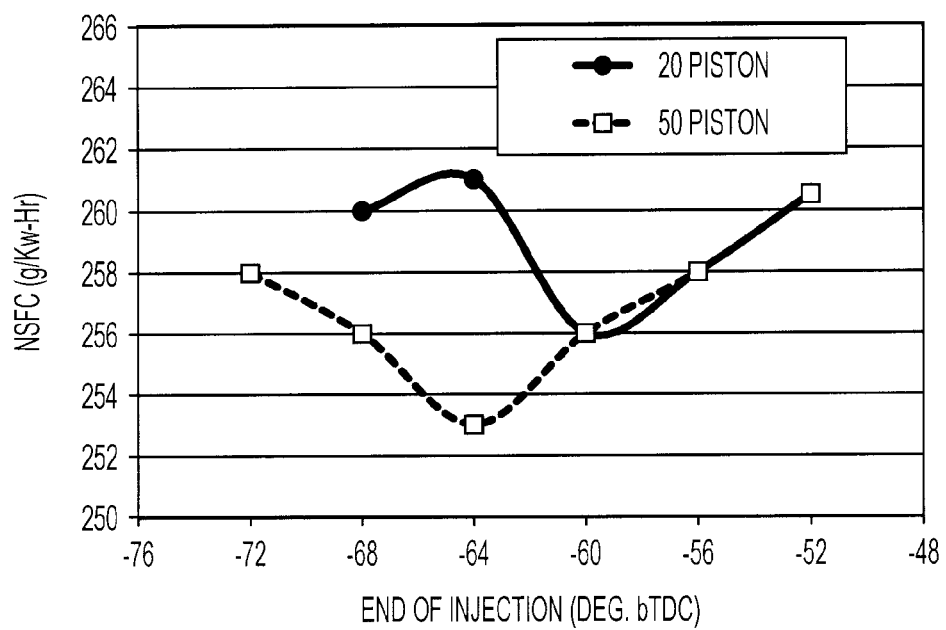
FIG. 15 shows dynamometer measured NSFC for the two embodiments of piston versus injection time at 1500 rpm/1 bar BMEP SC operation.

FIG. 15 shows dynamometer measured NSFC for the piston 20 and piston 50 at 1500 rpm/1 bar BMEP SC operation versus injection time. The exhaust valve timing in the engine with piston 50 is 10 degrees more retarded relative to the engine with piston 20. As shown in FIG. 15, the engine with piston 50 improves fuel economy at stratified-charge operating conditions by 1.2%.

Figure 16:
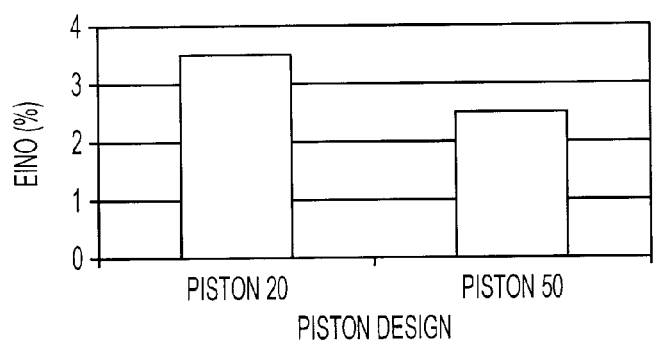
FIG. 16 shows dynamometer measured NOx reduction with the two embodiments of piston at 1500 rpm/1 bar BMEP SC operation.

FIG. 16 shows dynamometer measured NOx reduction with piston 20 and piston 50 designs at 1500 rpm/1 bar BMEP stratified-charge operation. The exhaust valve timing in the engine with piston 50 is 10 degrees more retarded relative to the engine with piston 20. As shown by FIG. 16, the NOx emission index is reduced by about 1%.

The performance of piston 50 has been further tested by comparing two other piston designs. Now, referring to FIGS. 9-10, the perspective views of two piston designs are shown.

Figure 9:
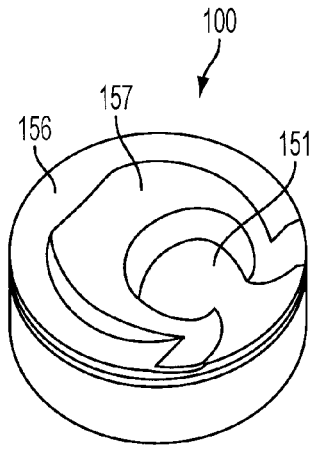
FIG. 9 is a perspective view of another embodiment of a bowl-in-piston.
Figure 10:
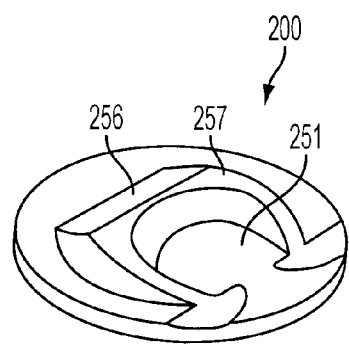
FIG. 10 is a perspective view of yet another embodiment of a bowl-in-piston.

The piston 100 and 200 have been designed to have the possibility of improving the homogeneous charge operations while preserving the stratified charge capability for the cold start operation. As shown in FIG. 9, piston 100 comprises flat surface 156, protrusion 157, and bowl 151. As shown in FIG. 10, piston 200 comprises flat surface 256, protrusion 257, and bowl 251.

FIG. 11 shows central cross-section of pistons 100, 200, along with piston 50. As shown in FIG. 11, piston 100 has a very shallow bowl. The bowl bottom of piston 100 is at the same horizontal level as the piston deck surface (the flat surface at the periphery of the piston). The bottom of bowl of the piston 200 is the same as that of the piston 100. But it has higher protrusion with a smaller radius. The piston bowl of piston 50 is deeper than that of piston 200.

Figure 17:
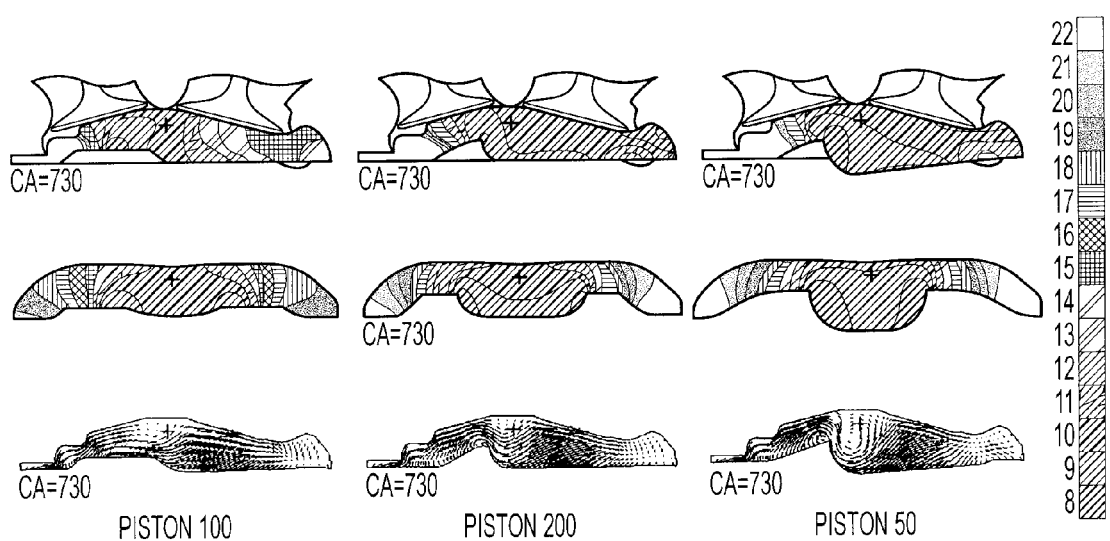
FIG. 17 shows an air-fuel contour plot and the velocity vector plot at 1500 rpm/1.2 bar BMEP CSSRE condition with split injection for three embodiments of piston.

FIG. 17 is an air-fuel ratio contour plot and the velocity vector plot at 1500 rpm/1.2 bar BMEP CSSRE condition with split injection for three types of pistons. FIG. 17 shows the cross-section of the predicted fuel-air mixture distribution and velocity fields at 10 degree after top dead center (ATDC) with the piston 100, piston 200, and piston 50 at 1500 rpm/2 bar NMEP (CSSRE) operating condition. The cross-section is the central section through spark-plug gap along the x and y direction. The injector simulated here is a 6-hole injector. The nominal injector flow rate is 25 cc/sec, rated at 100 bar fuel pressure and 1 bar back-pressure. The injector operating pressure is 35 bar at this operating condition. The end of the injection is 260° before Top Dead Center (bTDC) for the first pulse and 40° for the second pulse. It can be seen that from piston 100, piston 200 to piston 50, the fuel air mixture becomes richer around the spark plug and there is more fuel contained in the bowl. A vortex flow structure is developed with the piston 50 design that tends to lift and hold the fuel cloud around the spark plug even after the TDC. The engine stability is closely related to the local fuel-air mixture distribution around spark plug gap location at the time of ignition. At this operating condition, the spark timing is around 10° after TDC. FIG. 17 shows that the mixture distribution of piston 50 improves more than that of piston 100 and piston 200. The modeling suggests that piston 50 design may make the combustion more stable with the retarded spark timing.

Figure 18:
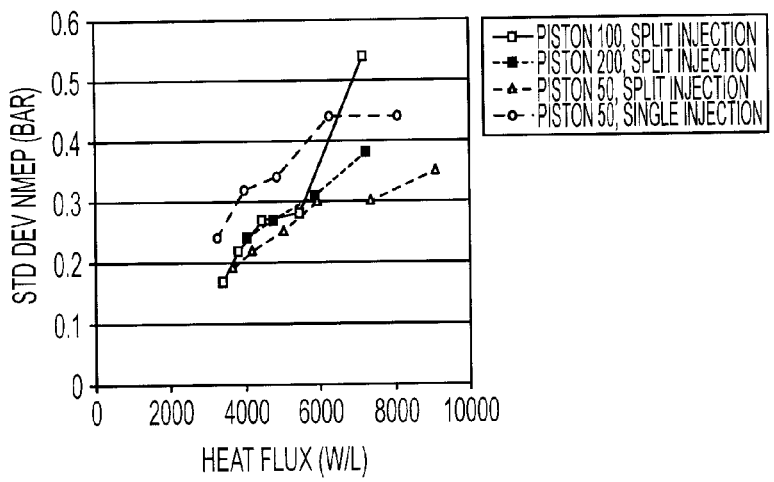
FIG. 18 shows dynamometer measurement of standard deviation versus heat flux at CSSRE condition.
Figure 19:
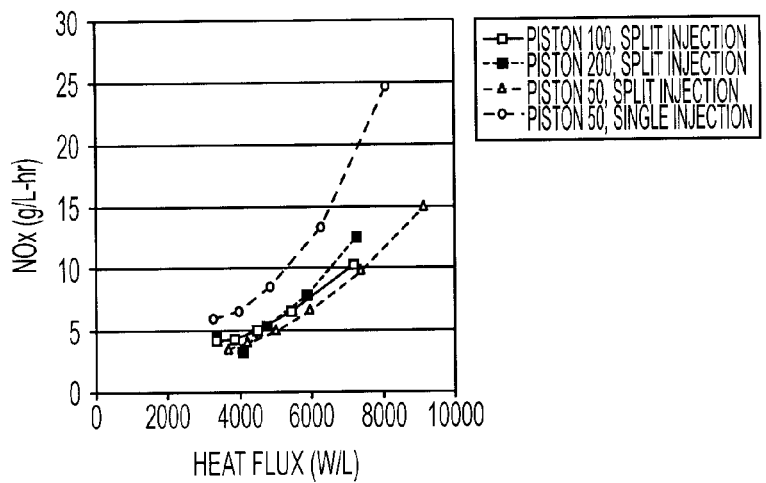
FIG. 19 shows dynamometer measurement of NOx emissions versus heat flux at CSSRE condition.
Figure 20:
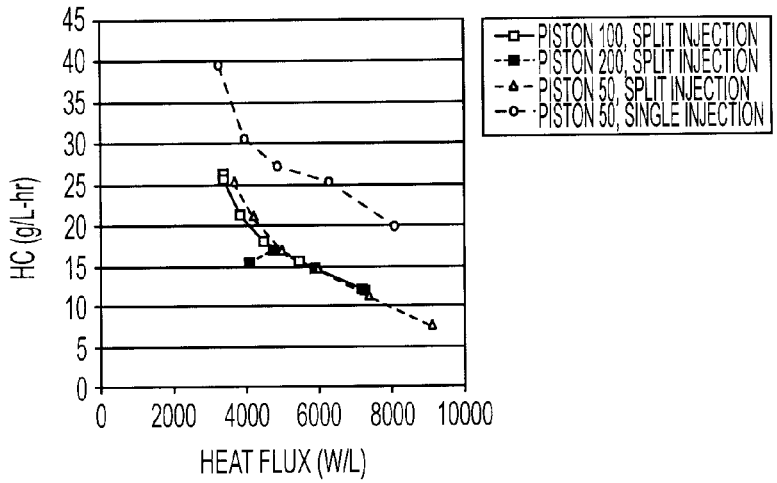
FIG. 20 shows dynamometer measurement of HC emissions versus heat flux at CSSRE condition.

FIGS. 18-20 show dynamometer measurement of engine with pistons 100, 200, 50 having split injection, and piston 50 having single injection at 1500 rpm/2 bar NMEP cold fluids (CSSRE) operating condition. FIG. 18 shows the change of standard deviation of NMEP with heat flux (W/L). The higher heat flux indicates late spark timing. As shown in FIG. 18, the engine with piston 50 operates more stable with a split injection for the late spark timing.

FIG. 19 shows the relationship of NOx emissions (g/L-hr) with heat flux (W/L), indicating that the engine with piston 50 produces lower NOx emissions with split injection. FIG. 20 shows the relationship of HC emissions with heat flux, indicating that the HC emissions are reduced for the engine with piston 50 with a split injection for the late spark timing.

As described above, the dynamometer engine testing data confirms that piston 50 design enables the engine to run stably at retarded spark timing with a split injection strategy and produce high heat flux and low emissions at cold start condition. Such piston design may help the combustion system to meet stringent emission standard at reduced cost.

It should be appreciated that pistons described above may be used in an engine running full stratified-charge combustion system.

It will be appreciated that the configurations and processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the injection and valve timing and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A piston in a direct injection spark ignition internal combustion engine, the piston being configured to reciprocate upward and downward within a combustion chamber along a reciprocating axis and comprising:
   an upper end which partly defines the combustion chamber; and
   a bowl defined on the upper end of the piston, the bowl having an at least partially curved sidewall region extending upward from a bottom surface of the bowl, the bowl being configured so that fuel injected laterally into the bowl toward the curved sidewall region from an injection side of the bowl is directed along the curved sidewall region and upward toward a spark plug of the internal combustion engine,
   where the bowl has a converging contour in which a curvature of the converging contour is greater at a portion of the contour near the spark plug than a portion of the contour near the injection side of the bowl.

2. The piston of claim 1, wherein the bottom surface of the bowl slopes upward toward the injection side of the bowl.

3. The piston of claim 1, wherein the curved sidewall region has a radius substantially equal to a deepest height of the bowl.

4. The piston of claim 1, wherein the bowl includes a substantially vertical wall segment adjacent and above the curved sidewall region.

5. The piston of claim 1, wherein the converging contour is defined by two different size circles with offset centers, where the smaller of the circles is disposed nearer the spark plug and the larger of the circles is disposed nearer the injection side of the bowl, and where the converging contour is defined within a plane generally orthogonal to reciprocating axis.

6. The piston of claim 5, wherein the converging contour further comprises two line segments substantially tangential to the two different size circles, and where the two line segments diverge moving toward the injection side of the bowl.

7. A piston in a cylinder of a direct injection spark ignition internal combustion engine, the piston being configured to move along a longitudinal axis of the cylinder and comprising:
   an upper end which partly defines the combustion chamber; and a bowl defined on the upper end of the piston and having an at least partially curved sidewall region extending upward from a bottom surface of the bowl toward a spark plug side of the bowl, and a sloped bottom rising upward toward an injection side of the bowl, the bowl being configured so that fuel injected into the bowl toward the curved sidewall region from the injection side of the bowl is directed along the curved sidewall region upward toward a spark plug of the internal combustion engine, wherein the bowl has a converging contour defined at least partially by a first circle and a second circle with offset centers, the second circle being closer to the injection side of the bowl and having a larger radius than the first circle.

8. The piston of claim 7, wherein the converging contour is further defined by two substantially straight line segments that are tangential to each of the first circle and the second circle.

9. The piston of claim 7, where the bowl is deeper at the spark plug side of the bowl than at the injection side of the bowl.

10. The piston of claim 7, wherein the bowl has a substantially vertical segment at the spark plug side of the bowl above the at least partially curved sidewall region.

11. The piston of claim 7, wherein the at least partially curved sidewall region has a radius substantially equal to a deepest height of the bowl.

12. An direct injection internal combustion engine, comprising
a spark plug;
a fuel injector, and
a piston being configured to move upward and downward within a combustion chamber of the engine along an axis, the piston including:
an upper end which at least partly defines the combustion chamber; and
a bowl formed on the upper end of the piston and having a fuel injector side and a spark plug side, the bowl having a converging contour which converges from the fuel injector side of the bowl toward the spark plug side, the bowl also having an at least partially curved sidewall region extending upward from a bottom surface of the bowl toward the spark plug side of the bowl, the bowl being configured so that fuel injected from the fuel injector is directed along the at least partially curved sidewall region upward toward the spark plug to promote stratified charge combustion.

13. The internal combustion engine of claim 12, wherein the converging contour is defined at least partially by two different size circles with offset centers, with the smaller of the circles being nearer the spark plug side of the bowl.

14. The internal combustion engine of claim 13, wherein the converging contour further comprises two substantially straight line segments which are tangential to the two circles.

15. The internal combustion engine of claim 12, wherein the at least partially curved sidewall region has a radius substantially equal to a deepest height of the bowl.

16. The internal combustion engine of claim 12, wherein the bowl further includes a sloped bottom surface rising toward the fuel injector side of the bowl.

17. The internal combustion engine of claim 16, wherein the bowl includes a substantially vertical segment above the at least partially curved sidewall region near the spark plug side of the bowl.

18. The internal combustion engine of claim 12, wherein the engine is operated with compression stroke fuel injection during a low load condition, and intake stroke fuel injection during a high load condition.

* * * * *